Jan. 17, 1939.    R. C. BENSON    2,144,322
HYDRAULICALLY CONTROLLED TRANSMISSION GEARING MECHANISM
Filed March 19, 1937
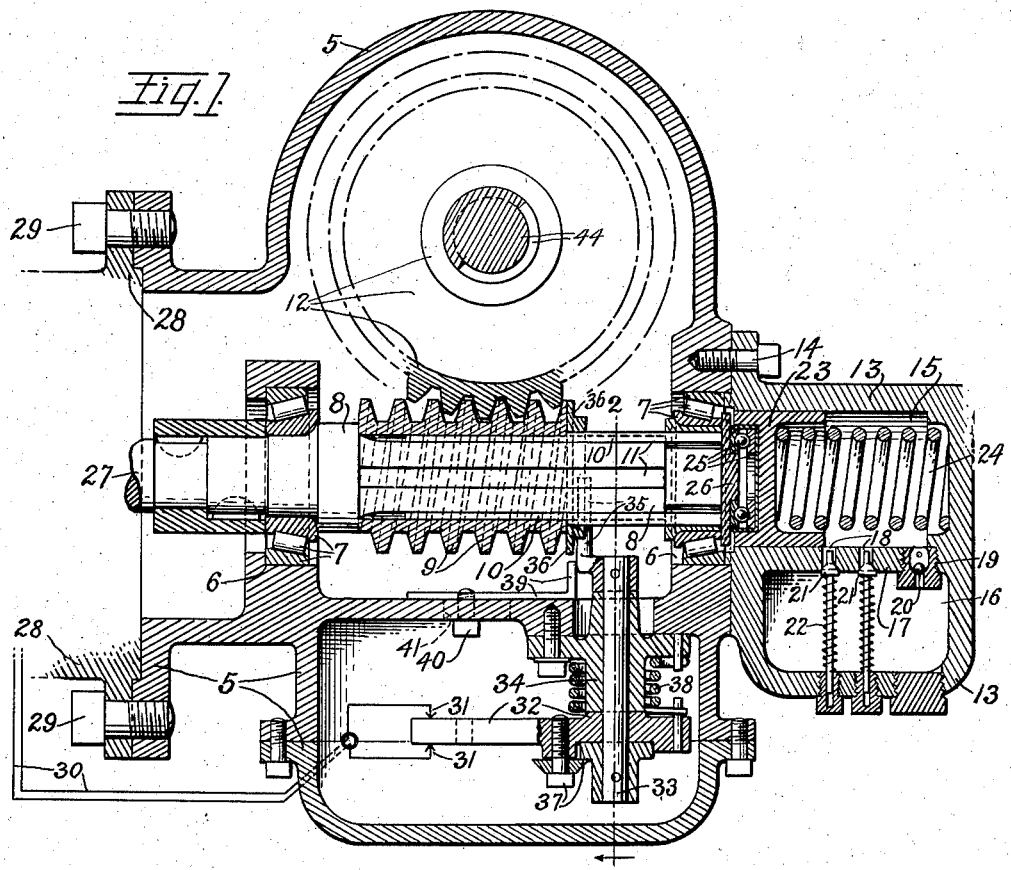
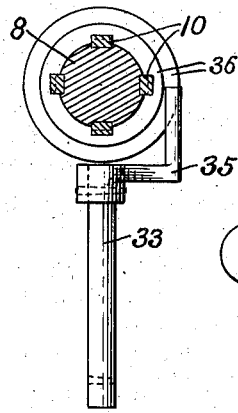
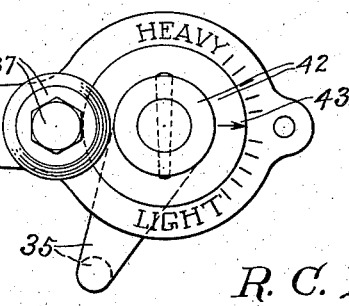
Inventor,
R. C. Benson.
By Sterling P. Buck,
Attorney.

Patented Jan. 17, 1939

2,144,322

UNITED STATES PATENT OFFICE 2,144,322

HYDRAULICALLY CONTROLLED TRANSMISSION GEARING MECHANISM

Ronald C. Benson, Camden, N. J.

Application March 19, 1937, Serial No. 131,852

4 Claims. (Cl. 74—411)

This invention relates to resistance-controlled power-controlling mechanisms, and specifically, to a hydraulically controlled transmission gearing mechanism.

One object of this invention is to provide, in a practical, compact and effective unit that is attachable to a motor or other power-source, an improved device which is controlled by a work-resistance in excess of a predetermined degree of resistance, and thereby controls or curtails the power of the power-source.

Another object is to rapidly increase the counter-resistance, viz., the resistance that is counter or opposed to the said work-resistance which is the resistance imposed by the work being done; so that the working operation of the device may be stopped very quickly but without any shock or impact.

Another object is to provide an improved adjustable power-controlling connector by the adjustment of which the time of curtailing the power may be varied with respect to any predetermined work-resistance.

Another object is to provide a pneumatic resistance device which is attachable to a gear-case in cooperative relation to the driving gear or to its axle so as to yieldingly resist axial movement of either the driving gear or its axle or both.

Other objects and important features are pointed out or implied in the following details of description, in connection with the accompanying drawing in which:

Fig. 1 is a view partly diagrammatic and partly in horizontal section in the plane of the axis of the driving gear-wheel and transversely of the axis of the driven wheel, only enough of the motor and motor-shaft being shown to illustrate the connection of the invention with its power-source.

Fig. 2 is a detail view of a part of the device in section along the line 2—2 of Fig. 1, to more clearly show the relation of the connecting arm to the driving wheel.

Fig. 3 is an enlarged elevation of certain parts shown in Figs. 1 and 2.

Fig. 4 is a detail view of one of the shouldered splines that cooperate with the driving gear for pressing the counter-resisting means.

Referring to the drawing in detail, in which, similar reference numerals refer to similar parts in the several views, the invention is described in detail as follows:

In the illustrated form of the invention, which shows only one of the numerous applications of which it is susceptible, a gear-casing 5 is provided with bearing-seats 6 in which are seated any appropriate type or kind of bearings 7 for the driving-axle 8 that carries the driving gear or worm 9 which is splined on the axle by means of splines 10 in grooves 11 respectively, so that the worm 9 cannot rotate with respect to the axle 8, but is driven rotatively by the axle and is slidable along the latter when the work-resistance of a driven wheel or worm-wheel 12 exceeds a predetermined degree and overcomes a counter-resistance such as is presently described.

A counter-resisting unit comprises a liquid container 13 attached to the gear-casing 5 by any appropriate means such as screws 14 of which only one is here shown, this container being divided into a primary chamber 15 and a secondary chamber 16 by means of an apertured partition 17 in which two of the apertures are seen at 18 while a third aperture 19 has a check-valve 20 therein for preventing the flow of liquid from the primary chamber to the secondary chamber, but permitting the liquid to flow from the secondary chamber to the primary chamber. Each aperture 18 is preferably a valve-seat in which a valve 21 is held normally closed by a spring 22 in such relation that liquid can pass from the primary chamber to the secondary chamber against resistance of the springs 22.

A piston 23 is slidingly fitted in the primary chamber and centrally alined with the extended axis of the driving wheel and axle so as to be movable along said extended line against a compression spring 24 whose resistance is counter to the work-resistance of the worm-wheel 12 in view of the fact that the splines 10, a thrust bearing 25 and a plate or disc 26 extend from the piston 23 to the driving gear-wheel or worm 9, and the shoulders 10a of the splines abut against the worm, so that the axial movement of the worm imparts or effects a movement of the piston against the counter-resistance of the spring 24 and of the liquid and air in the primary chamber 15. It is essential that there shall be some air in the partitioned container with the liquid so as to provide the necessary resilience, while the liquid avoids excessive resilience. The piston slides against the partition so as to close the openings 18 successively; and as each opening is closed so the liquid cannot pass therethrough, the counter-resistance is thereby increased; so, when the second or last one of these openings or apertures is closed, the movement of the piston is then resisted by a somewhat resilient cushion of air and liquid in the far end of the chamber 15 from the end where the piston is normally held by the spring 24. For permitting the spring 24 to return the piston rapidly to the normal position, and without shock or impact, the check-valve 20 permits the liquid and air to flow from the secondary chamber to the primary chamber as there is a suction produced by the spring 24 and piston 23 when the work-resistance is sufficiently reduced or annulled.

The reduction or annulment of the work-resistance can be effected in any one of a number of ways, one of which is to stop the operation of the power-applying means and turn the power-applying shaft slightly backward, whereupon there will be no resistance to the return of said piston. Now, in this embodiment of the invention the shaft 27 is an electric motor shaft, parts of the casing of the motor being shown at 28, secured to the frame or casing 5 by any appropriate means, for instance, screws 29; and at 30 is indicated a part of the wiring of the motor, including contact elements 31. An arm 32 of conducting material is normally between and in contact with the elements 31 so as to close the circuit of the motor 27—28, and this arm is mounted on a shaft or pivot-rod 33 journaled in a bearing 34 of the frame or gear-case 5 and has thereon a second arm or crank-arm 35, the latter being in the path of axial movement of an annulus 36 on the shaft or axle 8 and against an end of the worm 9; so that, as the worm and the annulus 36 move axially towards the chamber 15, the arm 35 is moved thereby so as to turn the pivot-rod 33 and thereby move the arm 32 out of contact with elements 31 and thereby cut off power from the motor-shaft 27, so the operation of the driving shaft and worm will cease. The arm 32 is adjustable around the rod 33 or in angular relation to the arm 35, and held in any one of an infinite number of adjustments by a clamping device shown at 37. A torsional spring 38 is engaged with the arm or member 32 so as to cooperate therewith for holding the rod 33 in a position that is predetermined by the adjustment of a stop-member 39 which normally keeps the crank-arm 35 out of contact with the annulus 36. Adjustments of the stop-member 39 may be made and maintained by means of a screw 40 in a slot 41, so the crank-arm 35 may thereby be held at various distances from the annulus 36 when the latter is in its normal position, and so the time of operation of the circuit-breaking or power-controlling device can be predetermined variously with respect to the extent of movement of the driving gear-wheel or worm.

Referring to Fig. 3, it is seen that the member 32 has thereon an indicator for guiding the operator in adjusting it for heavy load or resistance, light load or resistance, and intermediate loads or resistances; and the hub 42 is provided with an index or pointer 43 to cooperate with the graduations of said indicator which includes the words "Heavy" and "Light".

In Fig. 1, the driven gear-wheel has an internally threaded hub in connection with a screw 44 which may be connected to a valve or to any load or source of resistance; but it is evident that if the driven wheel were connected to an axle, instead of a screw, there would be a different resistance-medium and probably a different degree of resistance; but the principles would be the same. Moreover, if two spur-gear-wheels were intermeshed or interengaged so that one drives the other, and if the resistance of the driven gear-wheel would cause axial movement of the driving gear-wheel toward a hydraulic controlling device and toward a power controlling device such as here shown, the principles would be the same. If the power-applying device were a fluid-motor instead of an electric motor, the arm 32 could be connected to a fluid-cut-off valve instead of the electric circuit, so the principles would be the same as in the device here specifically described and shown. The gear casing 5 and the hydraulic container 13 are so designed with respect to one another that they may be secured together at various angles around the extended axial line of the axle 27, according to the direction of the axis of worm-wheel 12; for it may be found desirable that the chamber 16 shall be over the chamber 15, instead of in the same horizontal plane therewith, so whatever excessive air may get into the chamber 15 will be forced through the valve-openings 18 as the piston moves toward the check-valve 20; and the upper side of the chamber 16 may be provided with an air-vent, or an air-compression-expansion chamber, according to whether much, little or no resilience is desired in the various uses to which this invention is applicable.

Therefore, I do not intend to limit my patent protection to the precise details here shown and described, for the invention is susceptible of numerous changes within the scope of the inventive ideas as implied and claimed.

I claim as my invention the following:

1. In a hydraulically controlled transmission gearing-mechanism, the combination of a driven gear-wheel operatively connected to a medium of work-resistance, a driving gear-wheel interengaged with said driven gear-wheel for rotating the latter against a predetermined degree of work-resistance, an axle on which said driving gear-wheel is mounted for rotation therewith and for axial movement relative thereto when said predetermined degree of work-resistance is exceeded, a liquid container having an apertured partition which divides it into a primary and a secondary chamber, a piston and a spring in said primary chamber in such relation that said spring is compressed against said piston so as to hold the latter yieldingly in its normal position, said piston being free to slide along said partition against the pressure of said spring and being effective to close an aperture of the partition so as to curtail the flow of liquid from the primary chamber and thereby increase the counter-resistance against movement of the driving gear-wheel along said axle, said piston being operatively connected to said gear-wheel for being slid by the latter along said partition.

2. In a hydraulically controlled transmission gearing-mechanism, the combination of a gear-casing provided with alined bearings, a gear-member seated in said bearings and provided with means to drive it longitudinally, a partitioned liquid container united with said gear-casing and including a primary chamber and a secondary chamber, said primary chamber being in the extended line of longitudinal movement of said gear-member, a piston within and movable along said primary chamber, a spring in said primary chamber and compressed against said piston and being effective to hold said piston yieldingly in its normal position, means being provided for cooperatively connecting said piston and gear-member so as to yieldingly hold said gear-member at its normal position while permitting the gear-member to move longitudinally against resistance of said spring, the partition of said liquid container having an aperture therethrough to permit liquid to pass into said secondary chamber from said primary chamber while cooperating with said spring in resisting the movement of said piston and thereby resisting the movement of said gear-member more and more as the latter moves longitudinally.

3. The combination defined by claim 2, said partition having a second opening therein provided with a spring-pressed valve to hold it yieldingly closed and to add to the resistance against the liquid that passes therethrough, said first and second openings being in proper positions for being successively closed by said piston as the latter is moved against the pressure of said spring.

4. In a hydraulically controlled transmission gearing mechanism, the combination of a gear-casing provided with axially alined bearings, an axle rotatably mounted in said bearings and provided with means to drive it rotatively, a worm splined on said axle in proper relation for rotating with the axle while being movable along the axle, a worm-gear-wheel interengaged with said worm in proper relation to be driven by the worm against a predetermined work-resistance, a partitioned liquid container united with said gear-casing and being inclusive of a primary chamber and a secondary chamber, said primary chamber being in the extended axial line of said worm, a piston in and movable along said primary chamber, a compression spring in the primary chamber and effective to hold said piston yieldingly at its normal position, means extending from said piston to said worm for cooperation with said spring and piston in holding the worm at its normal position on said axle while permitting the worm to move axially when the predetermined work-resistance is exceeded, the said partition having therein an opening to permit liquid to flow into said secondary chamber from said primary chamber while cooperating with said spring in resisting the movement of said piston and thereby resisting the axial movement of said worm gear-wheel, said partition having a second opening therein spaced from the first said opening in the path of movement of said piston and being provided with a spring-pressed valve which adds to the resistance of the liquid that passes through this second opening, said openings being thereby properly related to the piston for being successively closed by the latter in its movement against pressure of the spring in the chamber therewith, said partition being provided with a return-passage having a check-valve threrein to prevent liquid from passing therethrough from the primary chamber to the secondary chamber and to permit liquid to flow to the primary chamber from the secondary chamber.

RONALD C. BENSON.